United States Patent [19]

Sackman, III et al.

[11] Patent Number: 4,916,717
[45] Date of Patent: Apr. 10, 1990

[54] CLOCK RESYNCHRONIZATION MECHANISM

[75] Inventors: Edward J. Sackman, III, Sunrise; Donald L. Wray, Lauderhill, both of Fla.

[73] Assignee: Racal Data Communications Inc., Sunrise, Fla.

[21] Appl. No.: 299,600

[22] Filed: Jan. 23, 1989

[51] Int. Cl.$^4$ ............................................. H04L 7/02
[52] U.S. Cl. ...................................... 375/107; 375/118
[58] Field of Search ................. 375/36, 106, 107, 118, 375/119; 370/100, 108

[56] References Cited

U.S. PATENT DOCUMENTS

| 4,187,394 | 2/1980 | Sievers | 375/118 |
| 4,189,622 | 2/1980 | Foshee | 370/100 |
| 4,554,673 | 11/1985 | Stevens | 375/36 |

OTHER PUBLICATIONS

Dogan A. Tugal and Osman Tugal, "Data Transmission Analysis, Design, Applications", copyrighted 1982 by McGraw Hill, Inc., pp. 168–173.
Duncan A. Jellichamp, "Real-Time Computing With Applications to Data Acquisition and Control", by Van Nostrand Reinhold Company, pp. 222–227.
"Data Communications Handbook 1985" by the staff of Signetics Corporation Microprocessor Division, pp. 25–28.

Primary Examiner—Benedict V. Safourek
Attorney, Agent, or Firm—William A. Newton

[57] ABSTRACT

Disclosed is an arrangement having a main card cage, a plurality of remote card cages, and a data transport system for transmitting synchronous information, the data transport system having at least one bust electrically coupling the card cages to define a plurality of data lines between the main card cage and each of the remote card cages, a master clock generator at the main card cage for generating a single master clock, and a clock resynchronizer at the main card cage for resynchronizing with the master clock data messages received from the remote card cages which have the same frequency, but are shifted in phase from the master clock.

6 Claims, 5 Drawing Sheets

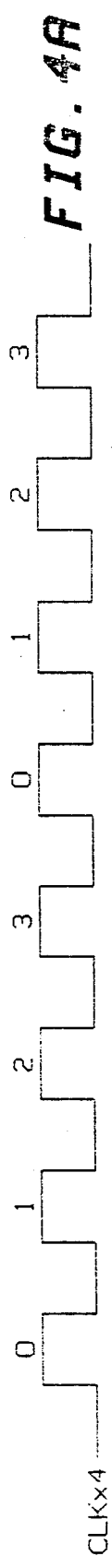

CLOCK RESYNCHRONIZATION MECHANISM

BACKGROUND

1. Field of the Invention

This invention relates generally to clock resynchronization techniques for a digital communication system between cards and spacedapart card cages.

2. Background of the Invention

Card cages are used to contain a plurality of cards, i.e., printed circuit boards, such cards being electrically coupled to each other by a backplane of the card cage. In some environments, there are a plurality of card cages distributed throughout a facility at the desired locations for the equipment. Typically, these cards in the card cages would comprise, for example, modems, digital service units, encryptors, multiplexers and like data communication or data processing equipment.

In separating the card cages, the only requirement of the system is that it must have the proper amount of cabling and repeaters available. However, the separation of card cages by substantial distances creates a problem in the turnaround delay through the various cables, drivers receivers, and repeaters that are encountered in such a bus implementation. The problem is that data passing over these cables and through these bus components are delayed relative to the clock at the component which is the destination of such data. One solution is to provide a clock at each card cage which would be transmitted with the data so that the receiving component would use the transmitted clock. However, the present inventors. To minimize system cost, decided that they wanted to design a system which could operate from a single master clock source located at a single card cage. When data is transmitted from this single cage with the master clock, no problem is incurred, in that the master clock and data can be transmitted to each of the other card cages and received together at those remote card cages in phase. However, when data is transmitted from a number of card cages back to the single card cage having the master clock, the receiving data will be normally out of phase with the master clock, due to the above-described delays caused by cable propagation, bus repeaters, bus drivers, and bus receivers. Moreover, the amount of phase shift is dependent upon which card cage the data was transmitted from.

Synchronous transmission of a serial data stream does not use start-stop bits to frame characters, as is done with asynchronous transmission. At the receiving equipment that receives the serial data stream, bit synchronization is achieved through a received clock signal which is coincident with the received serial data stream. Typically, the received clock signal is either transmitted with the data, or derived from the data. This technique of deriving the clock from the data, called selfclocking, overcomes the effect of propagation delay between distant stations by deriving the clock, typically by the use of phase lock loops, from the 0 to 1 and 1 to 0 transitions occurring in the digital received data. With the derived clock, each bit period can be sampled toward its middle. As a result of the sampling, the incoming data is regenerated in synchronism with the derived clock.

SUMMARY OF THE INVENTION

The present invention is utilized in an environment where there are a plurality of card cages disposed in substantially spaced-apart relationship throughout a facility where such spacing dictates the use of substantial links of cabling and repeaters, which in turn create turnaround delays through the various cables, drivers, receivers and repeaters as heretofore described. The present invention utilizes a data transport system having a bus implementation with a single master clock source, as opposed to a plurality of clocks with one at each card cage, to reduce the overall system cost. To allow for the use of a single master clock source located at a single card cage, the present invention includes a clock resynchronization mechanism located at the main card cage having the master clock source. The clock resynchronization mechanism receives out of phase data from other card cages and resynchronizes such data with the master clock.

The present invention is directed toward an arrangement having a main card cage, a plurality of remote card cages, and a data transport system for transmitting a plurality of data message of synchronous binary information. The data transport system has at least one bus electrically coupling the card cages so as to define a plurality of data lines between the main card cage and each of the remote card cages. The improvement in the data transport system of the present invention comprises at the main card cage having a master clock generator means for generating a single master clock and a clock resynchronizer means for resynchronizing the received data messages from the remote card cages. More specifically, the clock resynchronizer means includes a data line selector means for detecting a first binary transition at the beginning of a received frame to determine (1) that the received data message has in face been received and (2) which one of the data lines transported the received data message. The clock resynchronizer means further includes a sample clock generator means for dividing the master clock into a plurality of sample clocks and a sample clock selector means for selecting one of the sample clocks at a predetermined point after the detection of the first binary transition of the data message. The clock resynchronizer means further includes a first in, first out device (FIFO) wherein the received data message is clocked in using the selected sample clock and the received data message is clocked out of the FIFO using the master clock so that resynchronization is established. The clock resynchronizer means further includes a line idle detector means for detecting the end of the received data message and clearing the various components so as to receive the next data message.

BRIEF DESCRIPTION OF THE DRAWINGS

Further objects and advantages of the present invention will become apparent as the following description proceeds, taken in conjunction with the accompanying drawings in which:

FIGS. 4A–4G are timing diagrams of the master and sample clocks of the present invention.

DETAILED DESCRIPTION OF THE PREFERRED EMBODIMENT

Figure 1:
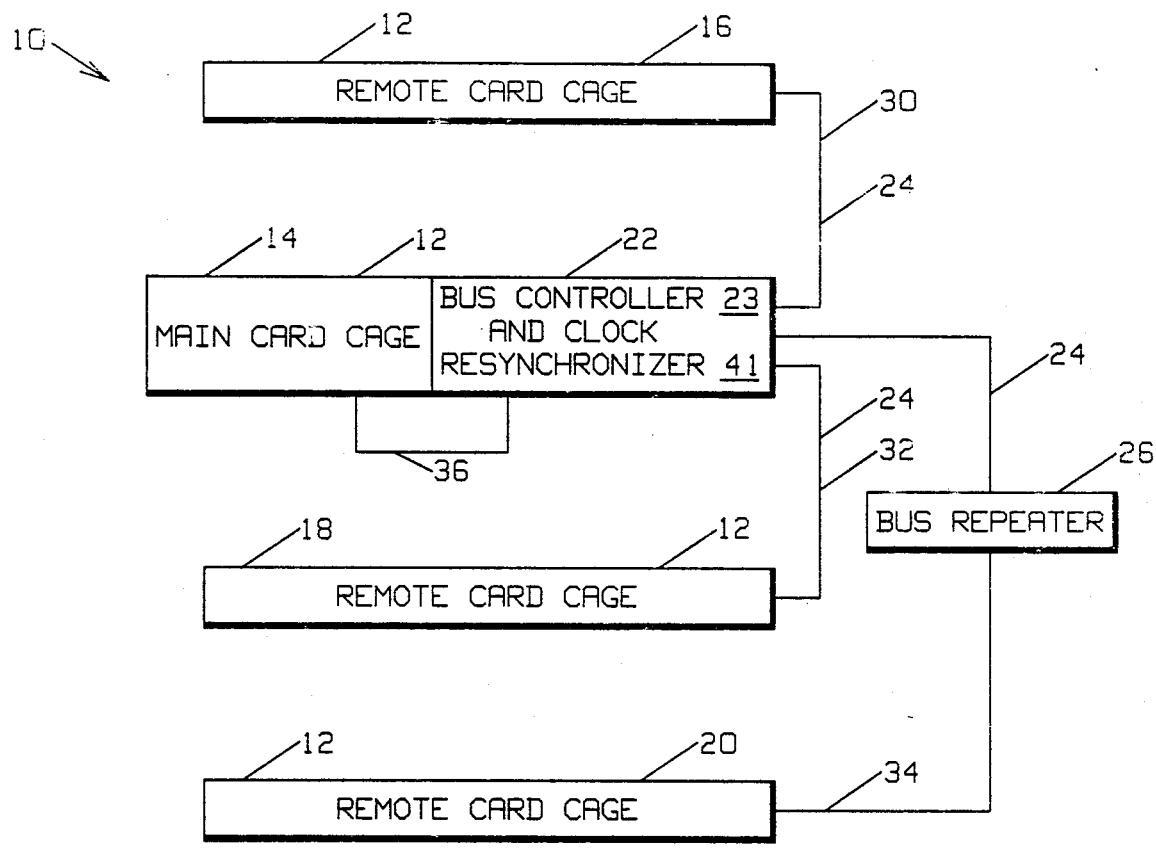
FIG. 1 is a generalized block diagram of a multiple environment with a bus system interconnecting the same.

Referring to FIG. 1, a data transport system 10 for transmitting synchronous data between a plurality of card cages 12 is illustrated. For the purposes of illustration, a main card cage 13 and three remote card cages 16, 18, and 20 are individually identified. Although three remote card cages are shown for illustration purposes, any number of remote card cages could be included in the data transport system 10. Although not shown, in a conventional arrangement each card cage 12 includes a plurality of printed circuit boards or cards, typically sub-grouped in a plurality of casings or modules. Each of these cards within a card cage is electrically coupled to each other by a backplane in a conventional manner. Also in a conventional manner, a bus expander board 22 is located in the main card cage 14 and includes a bus controller 23 to control the communications between the card cages 12 over a first bus 24. Additionally, an optional expander board (not shown) may be provided for a second bus (not shown) to provide backup for the possible failure of expander board 22 or bus 24. There is no theoretical maximum distance between card cages 12, since the distance that will separate card cages 12 will depend only upon the customer's requirements. Typically, conventional drivers, receivers, transceivers and repeaters are incorporated into such a bus system to allow for card cages to be substantially spaced apart from each other.

In a conventional manner, the expander board 22, via bus 24, is coupled to the backplane of the main card cage 14 and the backplanes of the remote cages 12. Typically, data would originate from the components of card cage 14, go to the expander board 22 and be transmitted with a master clock to the backplanes of the remote card cages 12 and to the backplane of the main card cage 14. Generally, for about every 100 feet of cable between the card cages, a repeater, such as a RS485 repeater, should be used to maintain the signal. One such repeater 26 is shown in the cable of bus 24 extending from the main cage 14 to the remote cage 20. Likewise, in a conventional manner, each card in the card cage would have a transmitter and receiver coupling each card to its backplane. These elements, along with the delays of the cables, creates the heretofore described delay problems. The bus 24 defines a plurality of data lines 30, 32, 34 and 36 extending outward from the expander board 24 to the backplanes of the cages 16, 18, and 20 and 14, respectively.

The bus controller 23 and bus 24 is of conventional design and has, for example, the bus controller 23 in the form of a well-known token passing system whereby only one of the data lines is active at a time. Such a system may, for example, comprise an IBM token ring bus system which meets the IEEE 802.5 specifications. The data transport system 10, to the extent described above, merely describes a conventional arrangement wherein a clock resynchronizer means 41 of the present invention is utilized.

Figure 2:
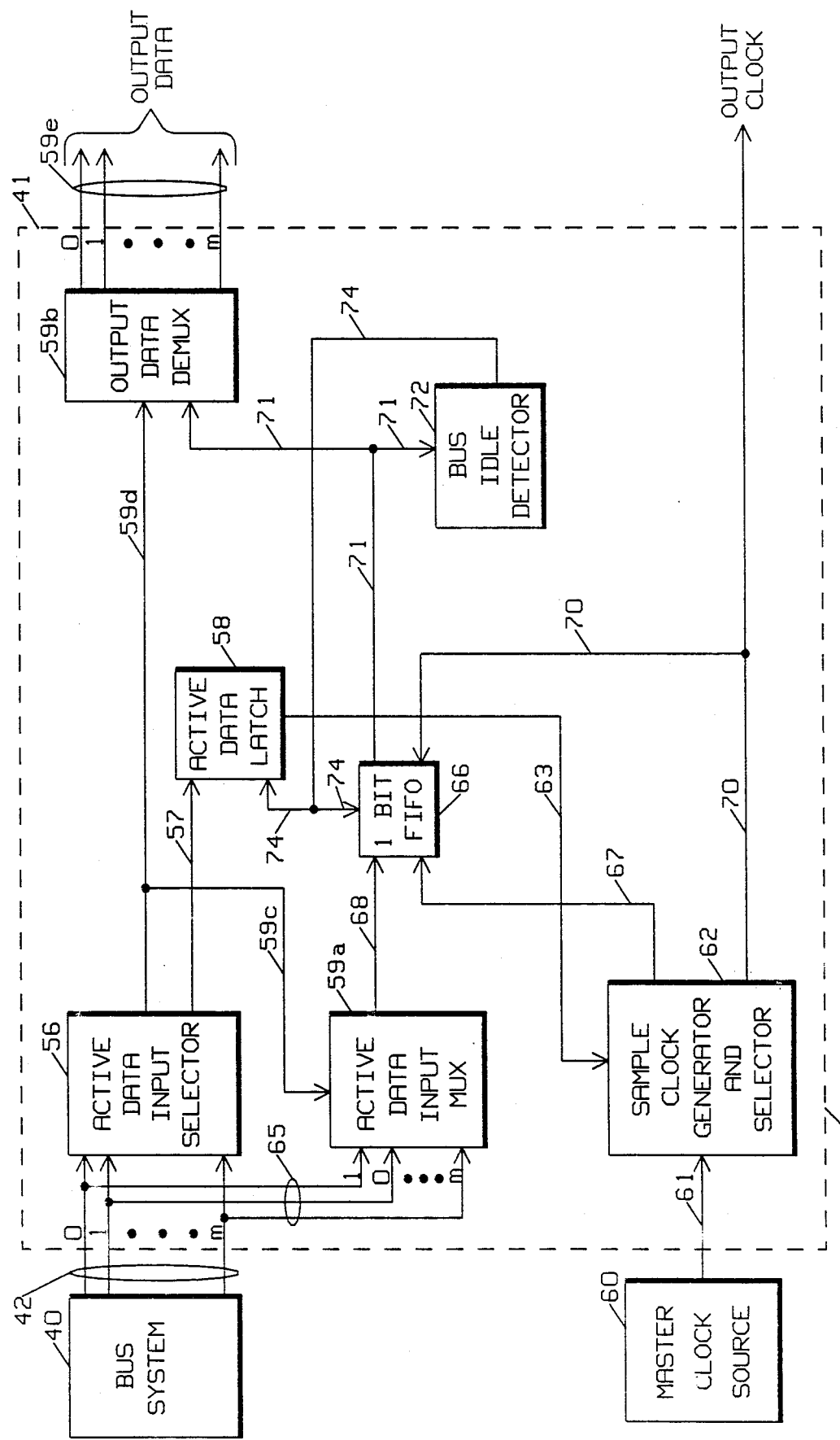
FIG. 2 is a block diagram of the clock resynchronizer means of the present invention.

Referring to FIG. 2, the clock resynchronizer means 41 is shown. Bus system 40 generally represents the previously described bus controller 23 and bus 24 shown in FIG. 1. Multiple line input data is provided from the data lines 42 of the bus system 40 to the clock resynchronizer means 41. More specifically, the data lines 0 through m of FIG. 2 represent the logical connections of the bus controller 23 and resynchronizer means 41 in main card cage 14 with the plurality of backplanes of the card cages 12 shown in FIG. 1 (illustrated in FIG. 1 by data lines 30, 32, 34 and 36), with each data line 42 of FIG. 2 representing a serial data path from one of such card cages 12 over the bus 24 shown in FIG. 1. Only one of these data lines 42 is active at a time. The data on each of these data lines 42 normally represent data in bit periods of substantially same frequency but displaced in phase relative to each other, due to the heretofore described delay problems.

Figure 3:
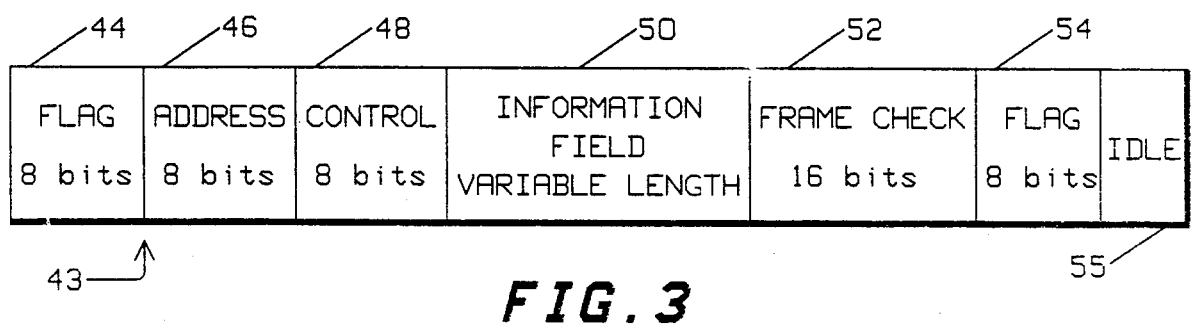
FIG. 3 chose a generalized data frame of a data message utilizing the HDLC protocol.

The data provided over the data lines 42 use HDLC data link control protocol. In this environment, the data-link control protocol generally is a set of rules that is followed by the various cards and card cages to allow for the orderly transfer of information. HDLC is a well-known bit stuffing protocol adopted by CCITT in X.25 (LAPB) Standard. In HDLC, synchronous digital data is sent in frames. A typical frame 43 is shown in FIG. 3 and includes a flag portion 44, address portion 46, control portion 48, information portion 50, frame check portion 42, end flag portion 54, which is followed by an idle signal 55. Each of these portions contain one or more characters. The flag portion 44 is a unique combination of bits (01111110) which lets the receiving device know that a field in HDLC format is about to follow. The end flag portion 54 comprises a flag and a FFHex (marking line), such end flag portion 54 marking the end of a standard frame. Referring back to FIG. 2, an active data input selector means 56 detects one of the data lines 42 going active and also identifies which line is active. More specifically, the selector means 56 detects the transition from 1 to 0 (mark to space) of the flag portion 44. By detecting the transition in the flag portion 44, this determines which of the end lines 42 is active. Via line 57, the information indicating that a line is active is fed from the selector means 56 to an active data latch means 58. Information indicating which particular line is active is fed to an active data input multiplexer 59a and output data multiplexer 59b by way of lines 59c and 59d, respectively.

Referring to FIG. 2, a master clock source 60, comprising a stable oscillator such as a RASCO oscillator, generates a 16 MHz clock (4x bus clock) and provides such clock by way of electrical line 61 to a sample clock generator and selector 62. In the sample clock generator and selector 62, the master clock is divided into four different phase clocks illustrated in FIGS. 4C through 4F as clocks through $\overline{1Y3}$. The timing diagram of FIGS. 4A through 4B further identifies the master clock from clock source 60 as CLKOUT and the master clock divided by four as CLKx4, which is the bus clock. The sample clock generator and selector 62 derives four distinctive clocks from the master clock, all of the same frequency, but incrementally displaced in phase, one from the other, by 90 degrees. The "best-fit" clock of sample clocks $\overline{1Y0}$ through $\overline{1Y3}$ is selected by the sample clock selector and generator 62 for sampling the data. The data has a bit period corresponding in duration to a complete cycle of the master clock, but, depending upon the origin of such data, is displaced from the master clock by a phase increment.

Referring to FIGS. 4A through G, the manner in which the resynchronizer means 41 of FIG. 2 selects a "best-fit" clock from the plurality of discrete sample clocks of FIGS. 4C through 4F will now be described. The four sample clocks basically divided each bit period into four incremental periods equal to one quarter of the time for one data bit. The four quarters per data bit are illustrated by the repeating numbers 0 through 3 in the diagram identified as CLKx4. The waveform identified as DATA illustrates part of a sample flag portion 44 of FIG. 3, with the 1 to 0 transition (identified as 64) that is detected by the active data input selector means 56 of FIG. 2. With reference to the positive edges of the sample clocks, e.g., 1 to 0 transitions, the sample clock generator 62 is latched by the active data latch 58 via line 63 to use the second positive edge after the 1 to 0 transition 64 for sampling the data, as shown by arrow 66. The second positive edge after the detected transition 64 is that of sample clock $\overline{1Y2}$ and is selected by the latch 58. The selection of the second positive edge gives good results in allowing the sampling of the data toward the middle of its bit period.

Referring to FIG. 2, having selected a sampling edge of one of the sampling clocks, this sampling edge is used to clock the input data into a FIFO (first in, first out device) 66. More specifically, the data on the detected active line 42 is also fed to the active data input multiplexer 59a over one of the lines 65. The multiplexer 59a time multiplexes data from the various data lines 65. Since only one data line is active at a time, there is no contention for the bandwidth of the multiplexer 59a. The selected sample clock $\overline{1Y}$ of FIG. 4C through 4F is fed from the generator 62 to the FIFO 66 over electrical line 67. The input data is clocked from the active data input multiplexer 59a to the FIFO 66 via line 68 using the selected sample clock Y of FIGS. 4C through 4F. The master clock CLKOUT of FIG. 4B is provided on line 70 to the output of FIFO 66 and is used to clock the data out of the FIFO 66 so that the extracted data is resynchronized with the master clock. In this manner, the FIFO 66 compensates for the difference in phase of the sample clock and the master clock, synchronizing the output with the master clock and thereby compensating for the heretofore described delays. This synchronization of the received incoming data with the master clock allows for reliable retransmission of data. The FIFO 66 can comprise 2D flip-flops, which can be described as a 1.N bit FIFO. Since the sample and master clocks have the same frequency and differ only in phase, it is unnecessary to have an extensive buffer. As frames of input data are received from different card cages 12 of FIG. 1, the sample clocks selected will vary according to the amount of phase shift occurring in such signals.

As the data is clocked out of the FIFO 66, it passes over line 71 to the demultiplexer 59b and a bus idle detector 72. The demultiplex 59b provides output data over the data lines 59e. The bus idle detector 72 is used to determine the end of the data message transmitted from a given input data line 42. More specifically, the bus idle detector 72 detects the eight 1 bits in the end flat portion 54 of the typical frame 43 shown in FIG. 3. Upon detection of the end of the frame, the bus idle detector 72, via lines 74, resets the FIFO 66 and the active data latch 58. This resetting allows another input data line 42 to activate the clock resynchronizer 41.

Figure 5:
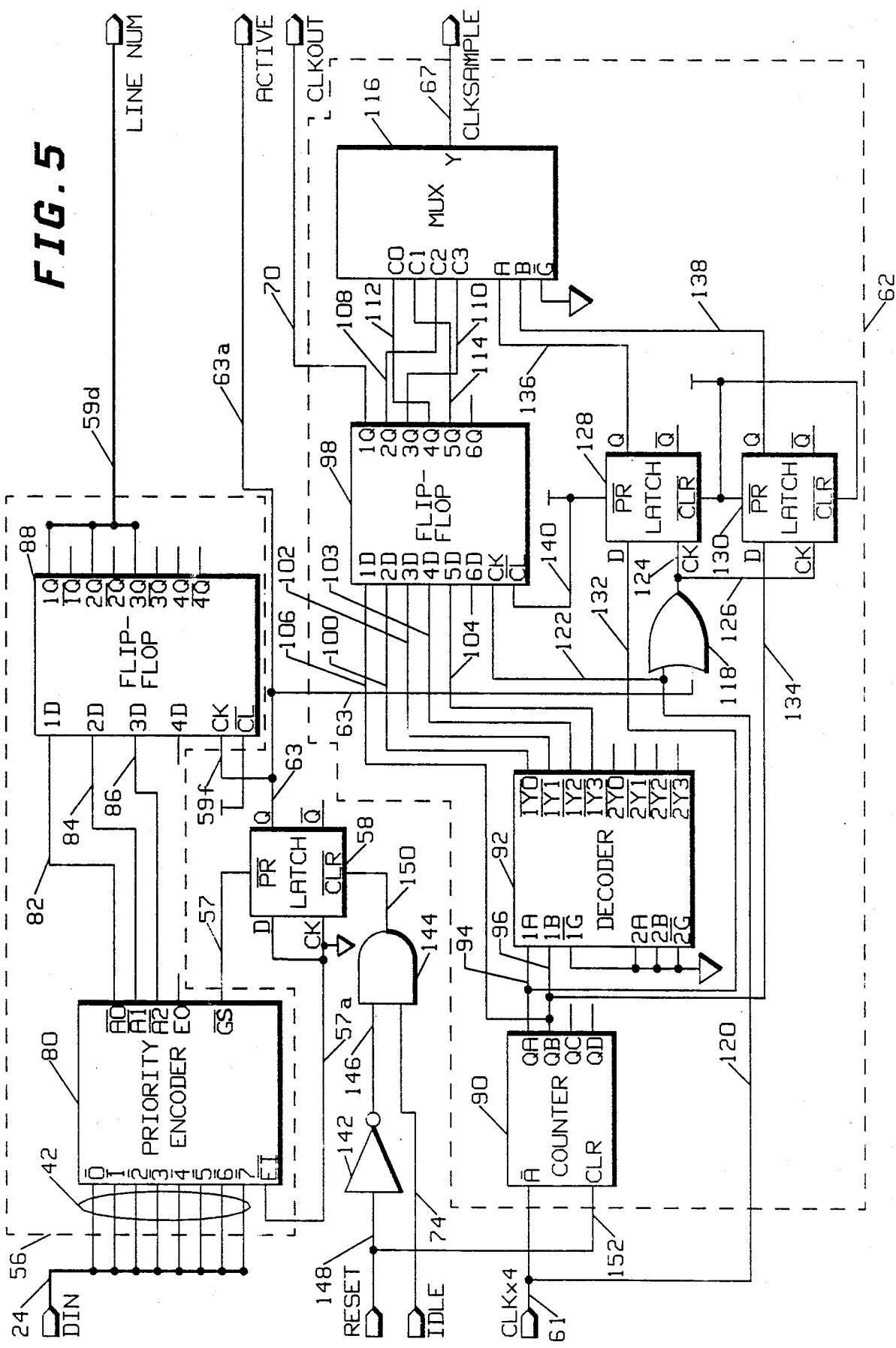
FIG. 5 is a detailed schematic of a portion of the clock resynchronizer means of the present invention.
Figure 6:
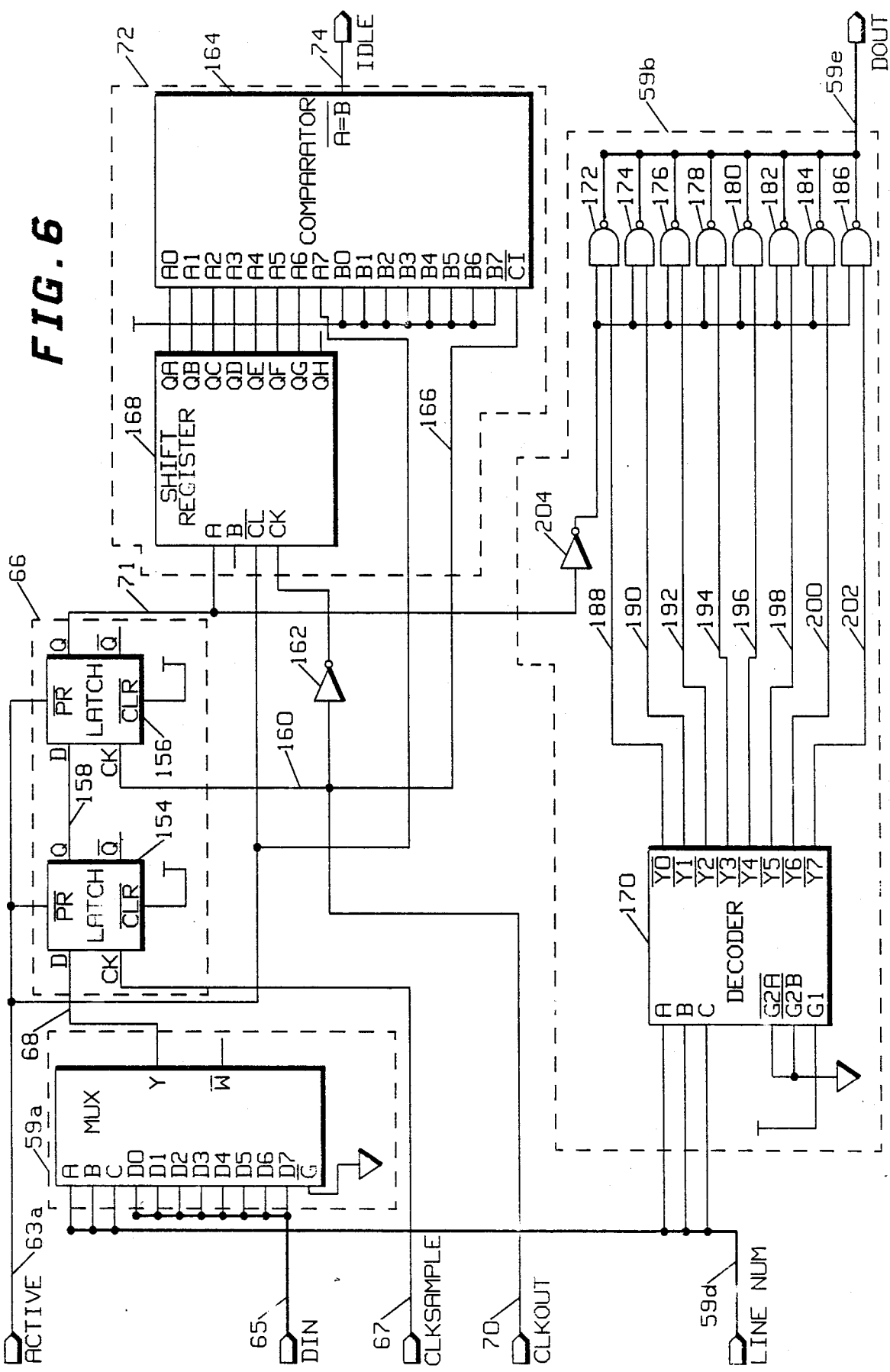
FIG. 6 is a detailed schematic of a portion of the clock resynchronizer means of the present invention.

FIGS. 5 and 6 show the components of FIG. 3 in more detail with same components being identified by the same reference numbers. Moreover, each integrated circuit is designated by its well-known and commonly used 74HC logic series part number.

In FIG. 3, the clock resynchronizer 41 was shown to have an active data input selector 56. Now referring to FIG. 5, this active data input selector 56 is shown in detail. The bus 24 defines the plurality of data lines 42 to an eight-three line priority encoder 80, commercially available and identified by part number 74HC148. Each of the data lines 42 is identified by a binary number shown in decimal form adjacent the data line in FIG. 5. The priority encoder 80 determines which one of these data lines 42 is active and provides the three bit binary number identifying such active line over lines 82, 84, and 86 to integrated circuit 88, a quad D flip-flop with clear, commercially identified by part number 74HC175. The line number (identified as LINE NUM) is then provided on line 59d to the components described with respect to FIG. 3. In FIG. 3, the input CK of the flip-flop 88 is connected to the Q output of the latch 58 by lines 59f and 63.

In FIG. 5, the sample clock generator and selector 62 of FIG. 3 is shown in more detail. A four bit binary ripple counter 90 receives the master clock (identified as CLKx4) from the master clock generator (not shown) over line 61. The counter 90 is commercially identified by part number 74HC393. The output of counter 90 drives a two-to-four line decoder 92 (identified by part number 74HC139) low via lines 94 and 96. The decoder 92 drives a hex D flip-flop (with clear) 98, identified by part number 74HC174, via lines 100 through 104. Output QB of the counter 90 is connected to the input 1D of the flip-flop 98 by way of line 106. Likewise, the output 1Q through 5Q of the flip-flop 98 is connected by lines 108 through 114 to inputs C0 through C3 of a four input multiplexer 116, which has apart number 74HC153. The output of the multiplexer 116 is the sample clock signal (identified as CLKSAMPLE) provided to line 67. As previously shown in FIG. 2, the sample clock signal 67 is provided to the FIFO 66. Referring back to FIG. 5, the output 1Q of the flip-flop 98 provides the master clock CLKOUT over the line 70. As previously shown in FIG. 2, this master clock is provided to the flip-flop 66. As previously described, the appropriate sample is latched via line 63 in FIG. 2. Returning to FIG. 5, this is shown in more detail. Line 63 is coupled to the input of an OR gate 118. Additionally, the master clock is provided over line 120 from line 61 to the OR gate 118 input. By this same circuit, the master clock is provided from line 120 over line 122 to the clock input of flip-flop 98. The OR gate 118 is a two input OR gate having a part number 74HC32. The output of the OR gate 118 is provided over lines 124 and 126 to the clock inputs of a pair of D flip-flops 128 and 130, respectively. Each of these flip-flops comprise a D flip-flop with set and clear having part number 74HC74. Additionally, the QA and QB outputs of the counter 90 are provided over lines 132 and 134 to the D inputs of the flip-flops 128 and 130. The Q outputs of the flip-flops and 128 and 130 are coupled respectively by lines 136 and 138 to the A and B inputs of the multiplexer 116. The CL terminal of the flip-flop 98 is connected to the PR terminal of the flip-flop 128 by line 140. The terminal EI of the priority encoder 80, the D and CK inputs of the latch 58 are connected to ground by line 57a.

In FIG. 2, the reset signal from the bus idle detector 72 was shown being provided over line 74. Referring to FIG. 5, line 184 is connected to the input of an inverter 142 having a part number of 74HC04. An AND gate 144 (part number 74HC08) has two inputs, one from the output of inverter 142 over line 146 and the other being the IDLE signal over line 74. The output of the AND gate 144 is coupled to the clear input of the latch 58 by line 150. The RESET signal, which is generated during initialization, is provided from line 148 to clear input of the counter 90 by line 152. The signal output of the latch 58 provided to line 63 is also provided over line 63a and is designated in the drawings as ACTIVE.

Referring to FIG. 6, the data lines 65 (labeled DIN) are connected to the inputs D0 through D7 of the multiplexer 59a, which is an eight input multiplexer having a part number of 74HC151. The output of the multiplexer 59a is provided over the line 68 to the FIFO 66. The FIFO 66 consists of two D flip-flops 154 and 156, both with set and clear and having a part number 74HC74. The output of flip-flop 154 is connected to the D input of flip-flop 156 by line 158. The CLKOUT signal (also shown in FIG. 4B) from line 70 is provided to the clock input of flip-flops 156 by line 160 and also is provided to an inverter 162 (part number 74HC04) and to the input of a comparator 164 by line 166. The selected sample clock (labeled CLKSAMPLE) is provided over the line 67 to the clock input of flip-flop 154. The Q output of the flip-flop 156 is provided by line 71 to the multiplexer 59b and the line idle detector 72. More specifically, the line 71 is coupled to an input of a shift register 168, which is an eight bit serial-N parallel out shift register having a part number of 74HC164. The line idle detector 72 includes the shift register 168 and the comparator 164 (which is an eight bit comparator having a part number of 74HC668). The ACTIVE signal of line 63 is provided to the PR inputs of the flip-flops 154 and 156 and also to the CO of the shift register 168 and the A7 of the input comparator 164. The output of the comparator 164 is the signal designated as IDLE provided to line 74.

Referring to FIG. 6, the signal ACTIVE is provided during startup to initialize the flip-flops 154 and 156 and the shift register 168. When the signals on the data lines of 42 go idle at the end of the packet, this line is used to initialize these components on a per packets basis by providing ones to the previously mentioned three components. The demultiplexer 59b (also shown in FIG. 2) consists of a decoder 170, which is a 3-8 line decoder having a part number of 74HC138. The multiplexer 159b also includes a plurality of two input NAND gates 172 through 186, each of which have one input connected to one of the outputs Y-1 through Y-7, respectively, of the decoder 170 via one of the lines 188 to 202, respectively. Moreover, the output signal of the flip-flop 156 over line 71 is provided through an inverter 204 to each of the other inputs of the NAND gates 172 through 186. The output of the demultiplexer 59b is provided over the plurality of data lines 59e (labeled DOUT). The line number (labeled LIN NUM) provided over line 59d is provided to the inputs a, b, c of multiplexer 59a and to the inputs a, b, c of the decoder 170.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. In an arrangement having a main card cage, a plurality of remote card cages, and a data transport system for transmitting a plurality of data messages of synchronous binary information, said data transport system having at least one bus electrically coupling said card cages to define a plurality of data lines between said main card cage and each of said remote card cages, wherein the improvement in said data transport system comprises:
   master clock generator means associated with said master card cage for generating a single master clock; and
   clock resynchronizer means associated with said main card cage for resynchronizing a received one of said data messages from one of said remote card cages and including:
   (a) data line selector means electrically coupled to said bus for detecting a first binary transition at the beginning of said received data message to determine that said received data message has been received and to determine which one of said received data lines has transported said received data message;
   (b) sample clock generator means for dividing said master clock to generate a plurality of sample clocks;
   (c) sample clock selector means for selecting one of said plurality of sample clocks based upon detecting said first binary transition;
   (d) first-in first-out means wherein said received data message is clocked into said first-in first-out means using said selected sample clock and said received data message is clocked out of said first-in first-out means using said master clock; and
   (e) line idle detector means for detecting an end to said received data message and for clearing said ressynchronizer means to receive a new one of said data messages.

2. In the arrangement of claim 1, wherein said data message comprises at least one frame, said frame beginning with a flag portion having said first binary transition.

3. In the arrangement of claim 2, wherein said frame has an end portion having a second binary transition and said line idle detector means operable to detect said second binary transition.

4. In the arrangement of claim 3, wherein said first-in first-out means comprises and first in, first out device having two flip-flops.

5. In the arrangement of claim 4, wherein said synchronous binary information defines a plurality of bit periods, said sample clocks define a plurality of sampling binary transitions distributed over each of said bit periods, and said sample clock selector means selects one of said sampling binary transitions for sampling said synchronous binary data.

6. In the arrangement of claim 5, wherein said line idle detector means is operable to clear said first-in first-out means, sample clock selector means and said data line selector means.

* * * * *